United States Patent
Otake et al.

(10) Patent No.: US 8,398,086 B2
(45) Date of Patent: Mar. 19, 2013

(54) SEALING ELEMENT AND SEALING METHOD INCLUDING FUSING THE ELEMENT

(75) Inventors: Yoshimasa Otake, Handa (JP); Yoshinori Nemura, Inazawa (JP)

(73) Assignees: Toyota Jidosha Kabushiki Kaisha, Toyota-Shi, Aichi-Ken (JP); Iidaindustry Co., Ltd, Nagoya-Shi, Aichi-Ken (JP)

( * ) Notice: Subject to any disclaimer, the term of this patent is extended or adjusted under 35 U.S.C. 154(b) by 417 days.

(21) Appl. No.: 12/674,424

(22) PCT Filed: Aug. 21, 2008

(86) PCT No.: PCT/IB2008/002968
§ 371 (c)(1), (2), (4) Date: Feb. 20, 2010

(87) PCT Pub. No.: WO2009/024867
PCT Pub. Date: Feb. 26, 2009

(65) Prior Publication Data
US 2011/0291362 A1 Dec. 1, 2011

(30) Foreign Application Priority Data
Aug. 21, 2007 (JP) .................................. 2007-215319

(51) Int. Cl.
*E04B 1/682* (2006.01)
*B60J 5/00* (2006.01)
(52) U.S. Cl. .................................. 277/316; 296/146.11
(58) Field of Classification Search .................. 277/316; 296/146.11
See application file for complete search history.

(56) References Cited

U.S. PATENT DOCUMENTS

| | | | | |
|---|---|---|---|---|
| 2,753,199 | A | * | 7/1956 | Victor ........................... 277/592 |
| 4,427,481 | A | * | 1/1984 | Smith et al. ................ 156/306.6 |
| 5,126,188 | A | | 6/1992 | Shimizu et al. |
| 5,443,704 | A | * | 8/1995 | Kirkpatrick et al. .......... 204/620 |
| 5,690,226 | A | * | 11/1997 | N'Guyen ....................... 206/438 |
| 5,964,979 | A | * | 10/1999 | George et al. .............. 156/309.6 |
| 6,030,701 | A | * | 2/2000 | Johnson et al. ................ 428/343 |
| 6,218,017 | B1 | * | 4/2001 | Yamashita et al. .......... 428/424.2 |
| 6,485,589 | B1 | * | 11/2002 | Johnson et al. .................. 156/83 |
| 6,489,023 | B1 | * | 12/2002 | Shinozaki et al. ...... 428/355 EP |

(Continued)

FOREIGN PATENT DOCUMENTS

| | | |
|---|---|---|
| DE | 44 27 270 A1 | 2/1995 |
| JP | 64-16479 | 1/1989 |

(Continued)

OTHER PUBLICATIONS

Notification of the First Office Action for Chinese Appl. No. 200880103841.8 dated Aug. 18, 2011.

(Continued)

*Primary Examiner* — Vishal Patel
*Assistant Examiner* — Nicholas L Foster
(74) *Attorney, Agent, or Firm* — Finnegan, Henderson, Farabow, Garrett & Dunner, L.L.P.

(57) ABSTRACT

A sealer (5) for sealing a sealed portion (3) is a sheet member formed into a shape that matches a three-dimensional shape of the sealed portion (3). The sealed portion (3) is sealed by placing the sealer (5) over the sealed portion (3) and heating the sealer (5).

14 Claims, 9 Drawing Sheets

U.S. PATENT DOCUMENTS

| | | | |
|---|---|---|---|
| 6,682,818 B2 * | 1/2004 | Czaplicki et al. | 428/413 |
| 6,962,338 B2 * | 11/2005 | Moidu | 277/316 |
| 7,022,400 B2 * | 4/2006 | Bolling et al. | 428/212 |
| 7,044,475 B2 * | 5/2006 | Imai et al. | 277/650 |
| 7,521,093 B2 * | 4/2009 | Finerman et al. | 427/375 |
| 7,575,653 B2 * | 8/2009 | Johnson et al. | 156/280 |
| 2005/0184463 A1 * | 8/2005 | Boutaghou et al. | 277/316 |
| 2006/0237963 A1 * | 10/2006 | More | 285/49 |

FOREIGN PATENT DOCUMENTS

| | | |
|---|---|---|
| JP | 3-35076 | 2/1991 |
| JP | 4-19497 | 2/1992 |
| JP | 5-131163 | 5/1993 |
| JP | 6-1259 | 1/1994 |
| JP | 11-503482 | 3/1999 |
| JP | 2001-138951 | 5/2001 |
| JP | 2004-360756 | 12/2004 |
| WO | WO 94/21741 | 9/1994 |
| WO | WO 95/13315 | 5/1995 |
| WO | WO 99/08901 | 2/1999 |
| WO | WO 02/00420 A1 | 1/2002 |
| WO | WO 03/018688 A1 | 3/2003 |

OTHER PUBLICATIONS

Notification of Reason(s) for Refusal for Japanese Application No. 2007-215319 dated Sep. 8, 2009.

Final Notification of Reason(s) for Refusal for Japanese Application No. 2007/215319 dated May 18, 2010.

* cited by examiner

SEALING ELEMENT AND SEALING METHOD INCLUDING FUSING THE ELEMENT

CROSS-REFERENCE TO RELATED APPLICATIONS

This application is a national phase application of International Application No. PCT/IB2008/002968, filed Aug. 21, 2008, and claims the priority of Japanese Application No. 2007-215319, filed Aug. 21, 2007, the contents of both of which are incorporated herein by reference.

BACKGROUND OF THE INVENTION

1. Field of the Invention

The invention relates to a sealer for sealing a sealed portion, and to a sealing method.

2. Description of the Related Art

Figure 10:
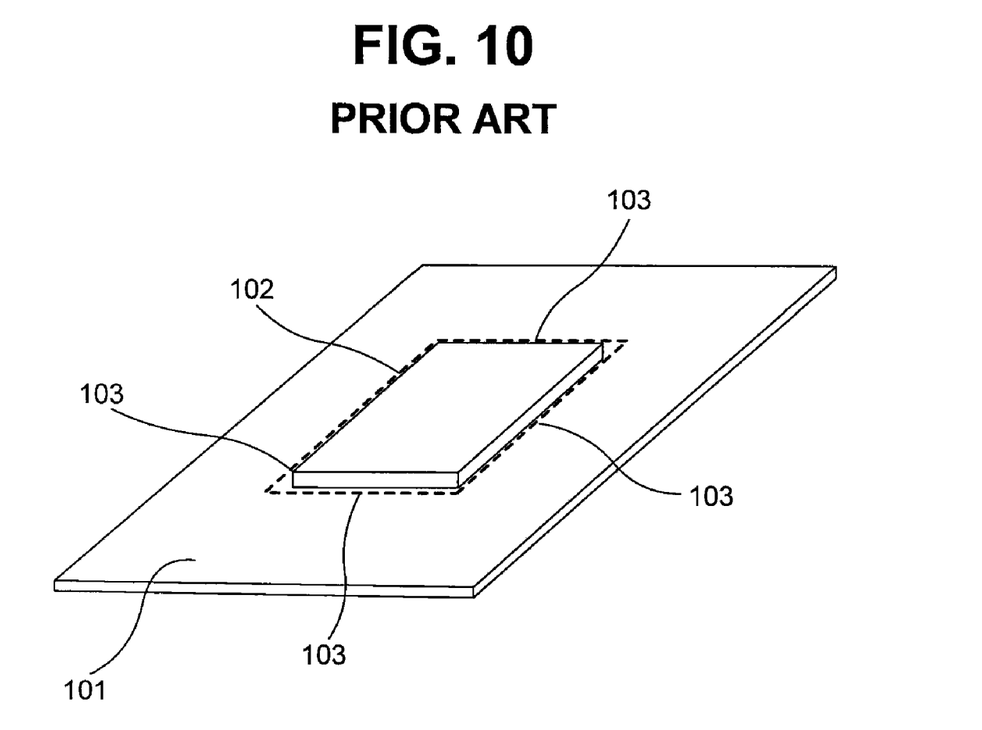
FIG. 10 is a perspective view showing a sealed portion to which a conventional sealer paste is applied.
Figure 11:
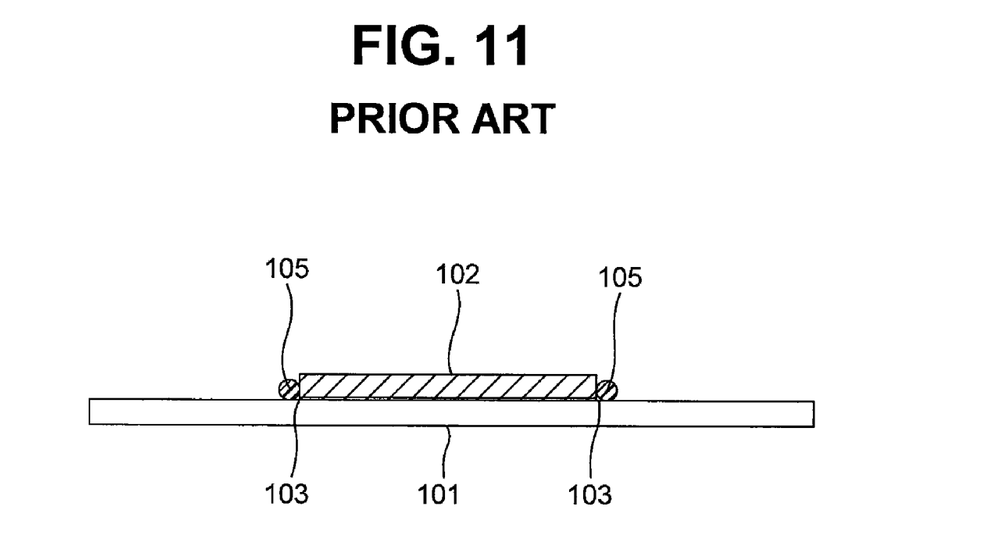
FIG. 11 is a sectional side view showing the sealed portion to which the conventional sealer paste has been applied.

In general, at a portion to be sealed (hereinafter also referred to as "sealed portion"), such as a joint portion or an overlapping portion between panels of the hood, doors, etc. of a vehicle body, there are a gap between the panels, a portion on which undercoating is insufficient, etc. For this reason, a sealer is applied to make such a portion watertight and rustproof, whereby the sealed portion is sealed. Such a sealer is made of a resin paste, and typically, applied to the sealed portion with the use of a gun-type applicator as described in Japanese Utility Model Publication No. 6-1259. In the assembly in which a member 101 and a member 102 are put together as shown in FIGS. 10 and 11, for example, the sealed portion to which the sealer is applied is a portion 103 in which the members 101 and 102 are put together, and the sealer is applied all around the portion 103 (the portion indicated by the dotted line in FIG. 10).

Application of a sealer is performed in a coating process in which a vehicle body is coated, and in the coating process, the step in which the sealer is applied is performed after an undercoating step (electrodeposition coating step). In addition, a drying step, in which the sealer is dried and cured by heating, a second coating step, and a finish coating step are performed after the sealer application step.

Figure 12:
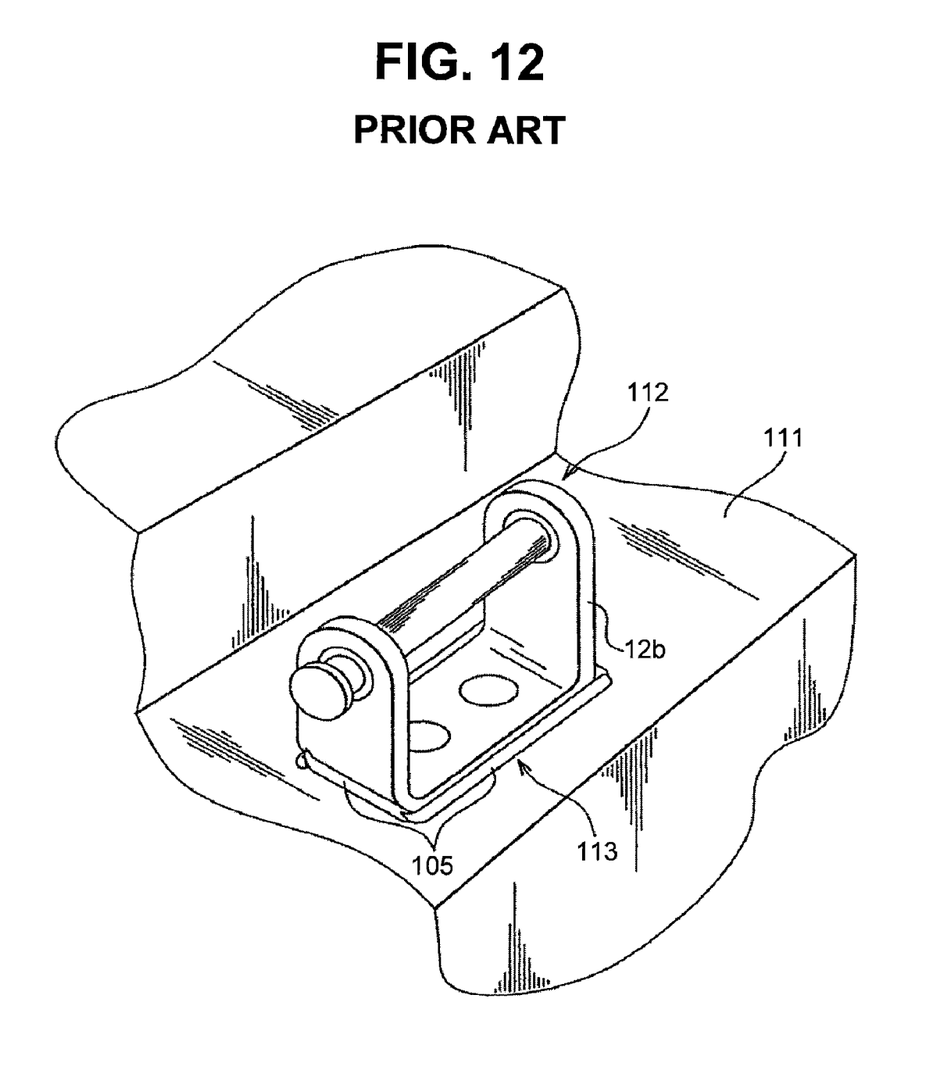
FIG. 12 is a perspective view showing a sealed portion to which a conventional sealer paste has been applied.

In the sealer application step, the sealer is applied to a hinge portion, which is a sealed portion to which the sealer is applied, for making the hinge potion watertight and rustproof. The hinge portion is provided at an open/close mechanism portion of the side doors and the back door. With regard to the hinge portion installed on the back door, for example, as shown in FIG. 12, a sealer 105 is applied to a portion 113 in which the vehicle body 111 and the hinge 112 installed on the vehicle body 111 are put together.

As described above, the sealer applied to the sealed portion of the vehicle body is applied using the above-mentioned applicator. In some cases, a finishing operation is performed in which the applied sealer is brushed with a brush to adjust the shape of the sealer. When the sealer is applied to the hinge portion of the back door, for example, it is problematic that the hinge portion of the back door is located at a ceiling portion of the vehicle body and therefore located at a high position, and in addition, the space for operations, such as application of the sealer and brushing with a brush, is small because there are stepped portions on the vehicle body near the portion on which the hinge is installed.

Specifically, because the working position at which the sealer is applied is located at a high position, it is difficult for an operator to perform the operation, standing on the floor. Thus, it is necessary for the operator to perform the application operation, standing on the step placed on the floor. In addition, because it is difficult for an operator to see the portion to which the sealer is applied, the operator has to take an unnatural posture to check the quality of the sealer (check the shape of the applied sealer, for example). Thus, the operation tends to be troublesome, and the fatigue caused by the operation tends to be significant. In addition, around the hinge portion, the space for the operation in which the sealer is applied is small, and the application of the sealer with the applicator and the finishing using a brush are not easy, and it is therefore necessary to spend much time to secure the quality of application of a sealer.

SUMMARY OF THE INVENTION

The invention provides a sealer and a sealing method with which it is possible to easily perform sealing using a sealer in a natural posture in a short period of time even at a position, such as a hinge portion of a back door, around which the space for the operation in which the sealer is applied is small.

The sealer and the sealing method for solving the above-described problems have the following features. A first aspect of the invention is a sealer for sealing a sealed portion that includes a sheet member formed into a shape that matches a three-dimensional shape of the sealed portion, wherein the sealed portion is sealed by placing the sealer over the sealed portion and heating the sealer. With this configuration, it is possible to seal the sealed portion simply by heating the sealer in a heating furnace after an operation is performed in which an operator places the sealer on the sealed portion. Thus, even when the sealed portion is located at a high position, it is possible to easily perform the operation in a comfortable posture, standing on the floor on which a sealing step is performed, and there is no need to perform the operation in an unnatural posture on a step placed on the floor. Furthermore, unlike the case where a sealer paste is used to perform the sealing operation, there is no need either to set an applicator to the sealed portion and apply the sealer thereto or to perform a finishing operation using a brush. Thus, even when the sealed portion is located at a position around which the space for the operation is small (even when there is no space enough to set the applicator or the brush to the sealed portion), the operation can be performed more easily. Thus, it is possible to finish the operation performed in the sealing step in a short period of time, the fatigue caused by the operation is small, and it is possible to secure the quality of sealing. Furthermore, the sealer can be appropriately formed in a shape that matches the three-dimensional shape of the sealed portion to be sealed. Thus, even when the sealed portion has a complex shape, it is possible to reliably perform sealing by using the sealer having a shape that matches the complex shape.

In the above-described first aspect, the sealer may be made of thermoplastic resin that is solid at room temperature, and softened or melted by heating. With this configuration, the sealer is solid and can be easily handled when the sealer is placed on the sealed portion. Meanwhile, because the sealer is softened or melted by heating in a heating furnace or the like in a drying step, the sealer sticks to the sealed portion, and it is possible to reliably perform sealing. The three-dimensional shape may have a height that is at least a few millimeters.

A second aspect of the invention is a sealer for sealing a sealed portion, the sealer being made of thermoplastic resin and formed in a shape that matches a three-dimensional shape of the sealed portion. With the sealer of the second aspect, as in the case of the first aspect, it is possible to finish the operation performed in the sealing step in a short period of time, the fatigue caused by the operation is small, and it is possible to secure the quality of sealing. Furthermore, even when the sealed portion has a complex shape, it is possible to reliably perform sealing by using the sealer having a shape that matches the complex shape. Moreover, the sealer is solid and can be easily handled when the sealer is placed on the sealed portion. Meanwhile, because the sealer is softened or melted by heating in a heating furnace or the like in a drying step, the sealer sticks to the sealed portion, and it is possible to reliably perform sealing.

In the above-described second aspect, the sealer may be formed thin. With this configuration, the volume of the sealer is minimized, and the sealer is highly flexible. Thus, it is made possible to easily set the sealer even at a portion around which the space for operation is small, and it is also possible to minimize the amount of material, that is, to minimize manufacturing costs. The sealer may have a hollow structure with at least one opening such that the sealer can be placed over the sealed portion. The three-dimensional shape may have a height that is at least a few millimeters.

A third aspect of the invention is a method of sealing a sealed portion, the method including: placing, over the sealed portion, a sealer that is a sheet member formed into a shape that matches a three-dimensional shape of the sealed portion; and heating the sealer placed on the sealed portion. With this configuration, it is possible to seal the sealed portion simply by heating the sealer in a heating furnace or the like after an operation is performed in which an operator places the sealer on the sealed portion. Thus, even when the sealed portion is located at a high position, it is possible to easily perform the operation in a comfortable posture, standing on the floor on which a sealing step is performed, and there is no need to perform the operation in an unnatural posture on a step placed on the floor. Furthermore, unlike the case where a sealer paste is used to perform the sealing operation, there is no need either to set an applicator to the sealed portion and apply the sealer thereto or to perform a finishing operation using a brush. Thus, even when the sealed portion is located at a position around which the space for the operation is small (even when there is no space enough to set the applicator or the brush to the sealed portion), the operation can be performed more easily. Thus, it is possible to finish the operation performed in the sealing step in a short period of time, the fatigue caused by the operation is small, and it is possible to secure the quality of sealing. Furthermore, the sealer can be appropriately formed in a shape that matches the three-dimensional shape of the sealed portion to be sealed. Thus, even when the sealed portion has a complex shape, it is possible to reliably perform sealing by using the sealer having a shape that matches the complex shape.

In the above-described third aspect, the sealer may be made of thermoplastic resin that is solid at room temperature, and softened or melted by heating. With this configuration, the sealer is solid and can be easily handled when the sealer is placed on the sealed portion. Meanwhile, because the sealer is softened or melted by heating in a heating furnace or the like in a drying step, the sealer sticks to the sealed portion, and it is possible to reliably perform sealing.

According to the invention, even when the sealed portion is located at either a high position or a position around which the space for operation is small, it is possible to easily perform sealing using a sealer in a natural posture, and therefore to finish the operation performed in the sealing step in a short period of time, the fatigue caused by operation is small, and it is possible to secure the quality of sealing. Furthermore, even when the sealed portion has a complex shape, it is possible to reliably perform sealing.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments for carrying out the invention will be described below with reference to attached drawings.

Sealers of the embodiments are used to seal a sealed portion, such as a joint or an overlapping portion between panels, a hinge portion, etc. of the hood, doors, etc. of a vehicle body to make such portions watertight and rustproof. The sealer is a solid member, and in particular, a thin, sheet-shaped member. This member is made of thermoplastic resin (so-called hot melt resin) that is solid at room temperature, and is softened, or melted and liquefied by heating. The liquefied state herein includes a semifluid state, such as a gel state, a paste state, etc. in addition to the completely fluidized state. The meaning of the term "thin" herein depends on the size of the sealer, and there is no specific numerical range. When the sealer according to the invention is used in a common passenger car, the thickness meant by the term "thin" ranges from approximately 1 mm to approximately 1 cm.

The sealer made of thermoplastic resin is softened, or melted and liquefied when heated with the sealer placed on a portion to be sealed, so that the sealer sticks to the sealed portion. Thereafter, the sealer is cooled and solidified, whereby sealing of the sealed portion is performed. The sealer has a hollow structure with at least one opening such that the sealer can be placed over the sealed portion in this way.

The sealer is formed in a shape that matches the three-dimensional shape of the sealed portion. For example, in FIG. 1, the entire periphery of the portion in which a second member 2 and a first member 1 are put together is a sealed portion 3 (the portion indicated by the dotted line FIG. 1) in the assembly in which the second member 2, which is formed in a plate shape that is smaller than the first member 1, is placed on the first member 1, which is formed in a plate shape, for example. The term "three-dimensional shape" means a shape that has a height that is at least a few millimeters. When the sealer according to the invention is used in a common passenger car, for example, the height is from approximately a few millimeters to a few centimeters.

Figure 1:
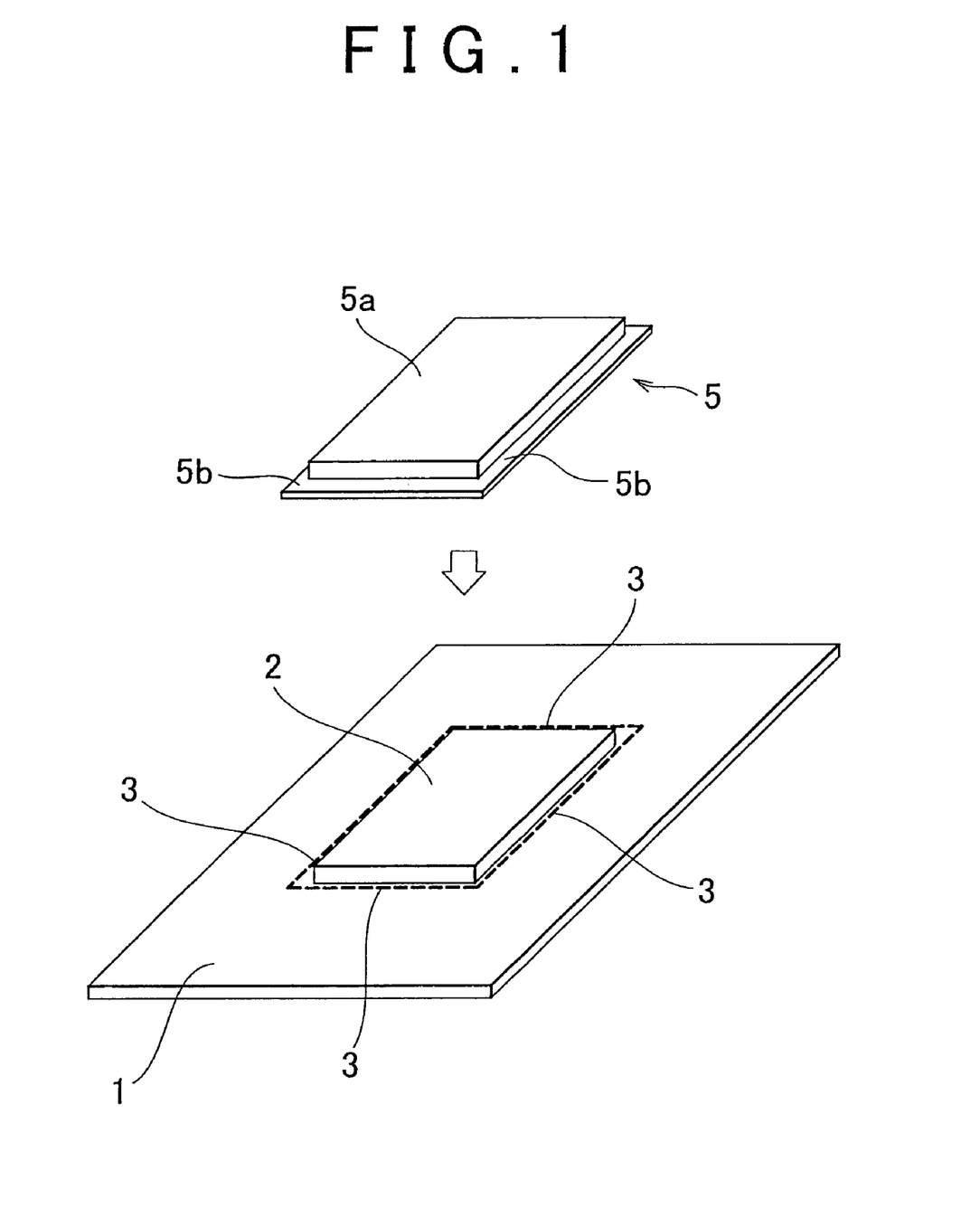
FIG. 1 is a perspective view showing a sealer according to the invention and a sealed portion.

A sealer 5 for sealing the sealed portion 3 is made by forming a sheet-like member into a shape that matches the three-dimensional shape of the sealed portion 3. Specifically, the sealer 5 includes: a body portion 5a that is formed in a box shape whose bottom is open, and that covers the top surface and the side surfaces of the second member 2; and a flange portion 5b that is extended horizontally outwardly from the lower end peripheral portion of the body portion 5a and contacts the first member 1. Thus, it is possible to seal the sealed portion 3 by placing the sealer 5 from above the second member 2, heating and melting the sealer 5 with the body portion 5a covering the second member 2 and with the flange portion 5b being in contact with the first member 1, and then cooling and solidifying the sealer 5.

Figure 2A:
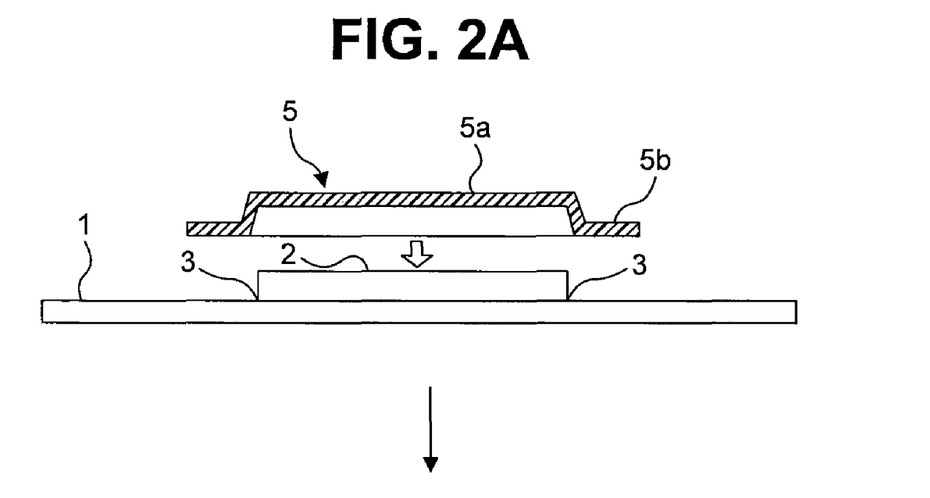
FIGS. 2A to 2C are sectional side views showing a method of sealing the sealed portion using the sealer.

A method of sealing the sealed portion 3 with the use of the sealer 5 will be specifically described with reference to FIG. 2. First, as shown in FIG. 2A, the sealer 5 that is made by forming the body portion 5a formed in a box shape whose bottom is open and the flange portion 5b that is extended horizontally outwardly from the body portion 5a with the use of a sheet-like member in accordance with the three-dimensional shape of the sealed portion 3, is placed from above the second member 2.

Figure 2B:
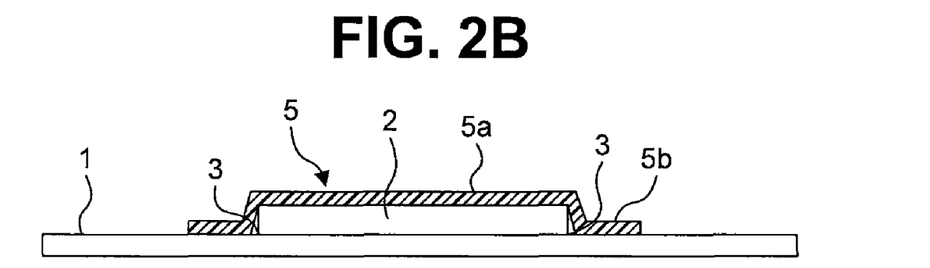

As shown in FIG. 2B, the placed sealing member 5 is in a state where the body portion 5a covers the second member 2 and the flange portion 5b is in contact with the first member 1. When the sealer 5 is heated for melting in this state, the sealer 5 is softened or liquefied, so that the body portion 5a sticks to the top surface and the side surfaces of the second member 2, and the flange portion 5b sticks to the first member 1.

Figure 2C:
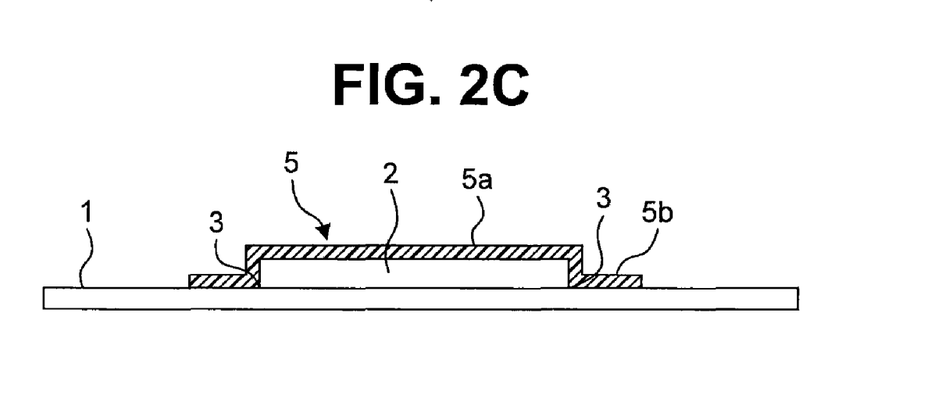

As shown in FIG. 2C, by cooling and solidifying the sealer 5 after the sealer 5 sticks to the first and second members 1 and 2, the gap between the first and second members 1 and 2 that are put together is sealed by the sealer 5, whereby the sealed portion 3 is sealed by the sealer 5.

Thus, when the sealed portion 3 is sealed by the sealer 5, it is possible to seal the sealed portion 3 by performing simple operations, such as placing the sealer 5 on the sealed portion 3, heating and melting the placed sealing member 5, and then cooling and solidifying the sealer 5.

Figure 3:
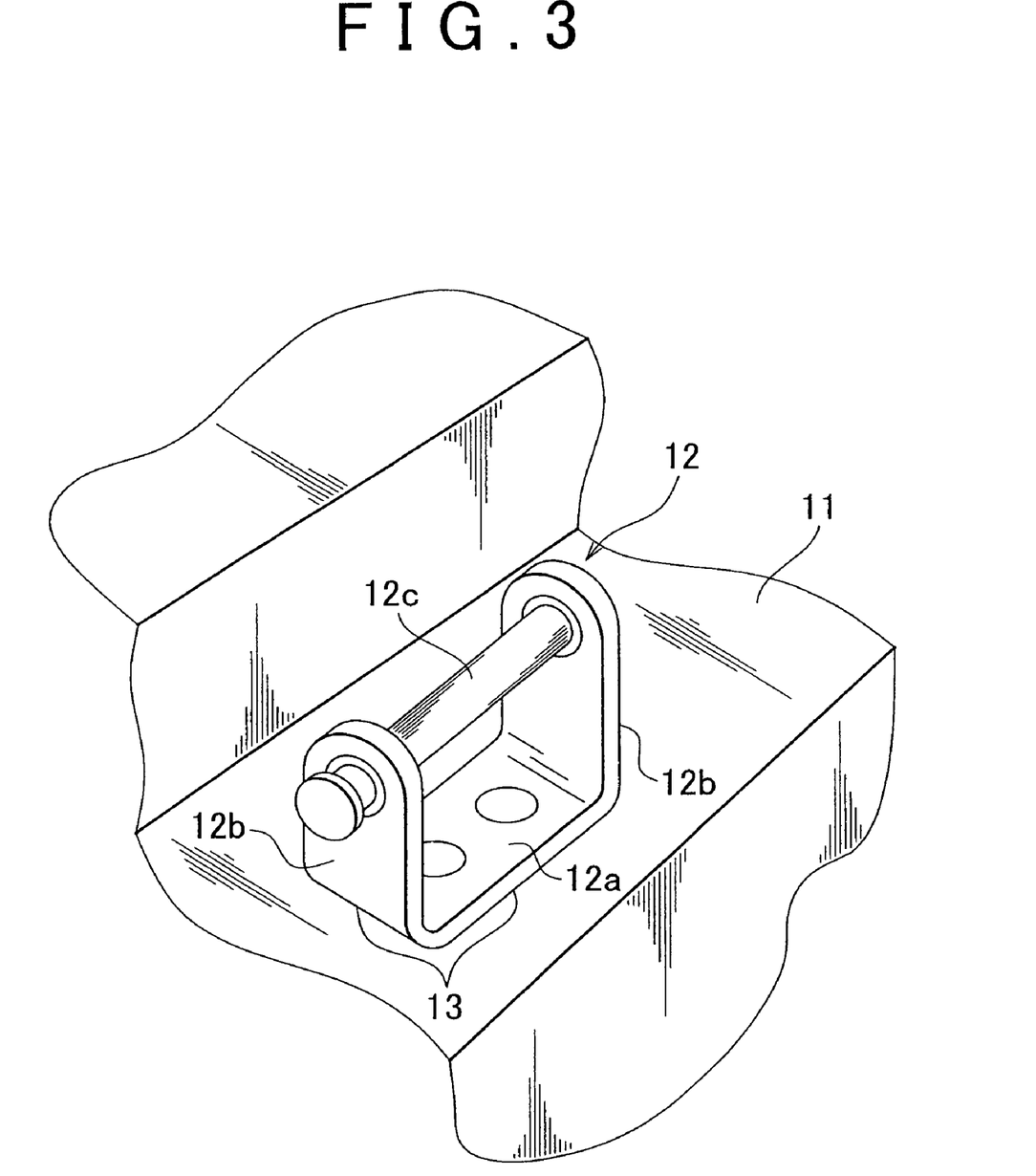
FIG. 3 is a perspective view showing a hinge portion, which is a sealed portion, of a back door of a vehicle body.

Next, as a specific example of the sealer 5, a sealer 51 that is configured to seal a hinge portion of a back door of a vehicle body will be described. In FIG. 3, the hinge portion of the back door of the vehicle body is shown, in which a hinge 12 is fixed onto a hinge fixation surface 11 of the vehicle body.

The hinge 12 includes: a bottom portion 12a that is fixed onto the hinge fixation surface 11; leg portions 12b that stand at the two ends of the bottom portion 12a; and a support pin 12c that is extended between the leg portions 12b, 12b. A back door-side hinge is rotatably fitted to the hinge 12 of the vehicle body, so that the back door is attached to the vehicle body so as to be able to be opened and closed.

In the hinge portion of the vehicle body, the bottom portion 12a of the hinge 12 and the hinge fixation surface 11 are put together. In this case, the hinge fixation surface 11 functions as the above-described first member 1, and the hinge 12 functions as the above-described second member 2. The portion in which the bottom portion 12a of the hinge 12 and the hinge fixation surface 11 are put together is a sealed portion 13.

Figure 4:
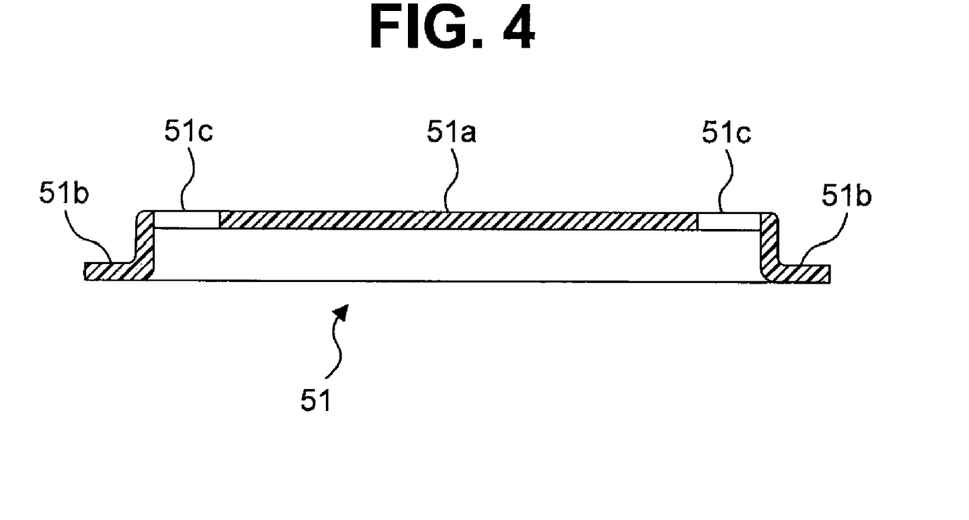
FIG. 4 is a sectional front view showing a sealer for sealing the hinge portion of the back door.
Figure 5:
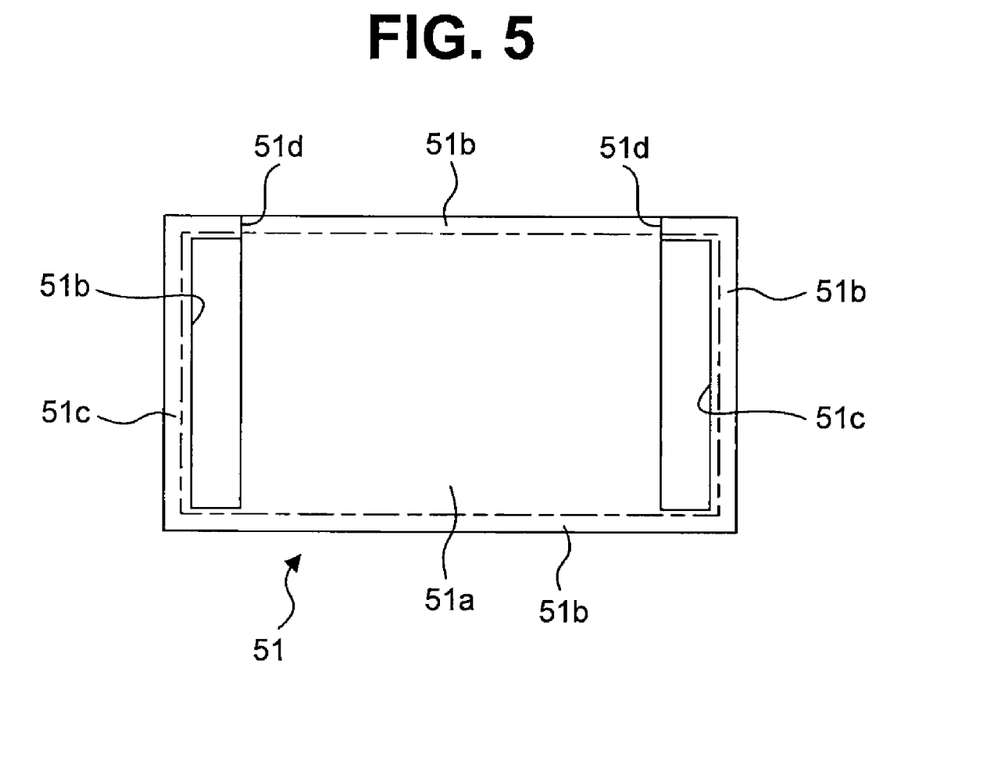
FIG. 5 is a plan view showing a sealer for sealing the hinge portion of the back door.

Meanwhile, as shown in FIGS. 4 and 5, the sealer 51 for sealing the sealed portion 13 includes: a body portion 51a that is formed in a box shape whose bottom is open and that covers the bottom portion 12a of the hinge 12; a flange portion 51b that is extended horizontally outwardly from the lower end peripheral portion of the body portion 51a; and through holes 51c that are formed in the body portion 51a and through which the leg portions 12b of the hinge 12 are passed. In addition, a cut 51d is formed in a part of the edge of the through hole 51c from the inner edge around the through hole 51c to the outer edge of the flange portion 51, and the edge of the through hole 51c is opened at the cut 51d.

The sealing of the sealed portion 13 using the sealer 51 with such a configuration is performed following the procedure described below. In this description, it is assumed that the axial direction of the support pin 12c of the hinge 12 is the lateral direction, and the front and rear is defined along the direction perpendicular to the axial direction of the support pin 12c.

Figure 6A:
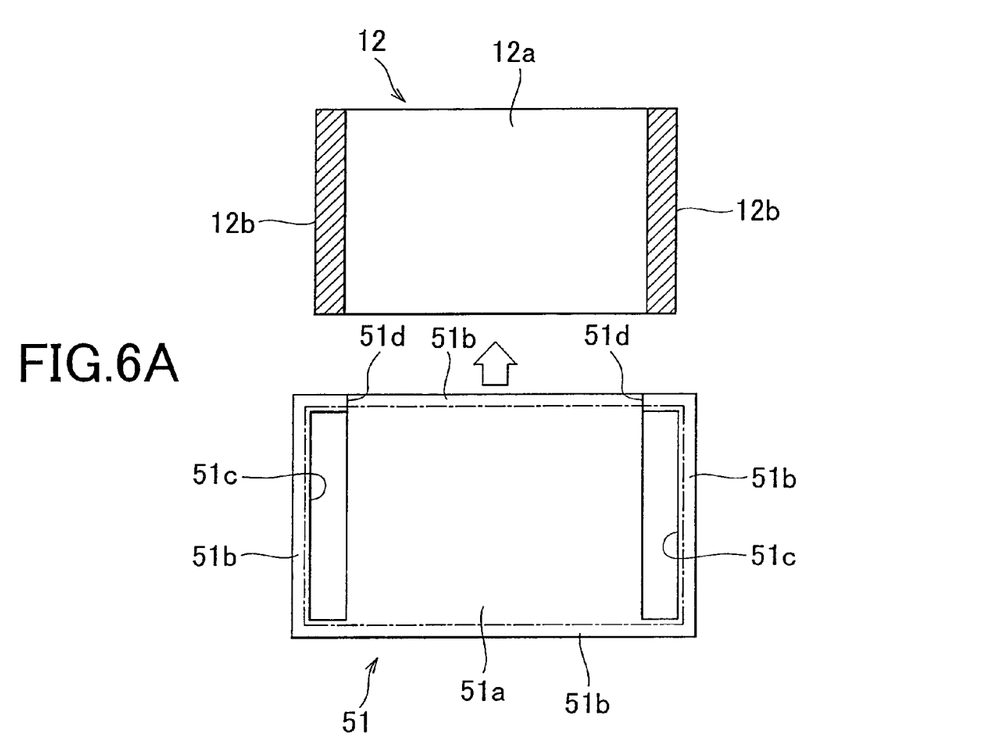
FIGS. 6A and 6B are plan views showing a procedure for placing the sealer on the hinge portion of the back door.

As shown in FIG. 6A, the sealer 51 is brought close to the front side (lower side in FIG. 6A) of the hinge 12 while the cuts 51d formed on one side, that is, the front or rear side, of the through holes 51c in the sealer 51 are oriented toward the hinge 12.

Figure 6B:
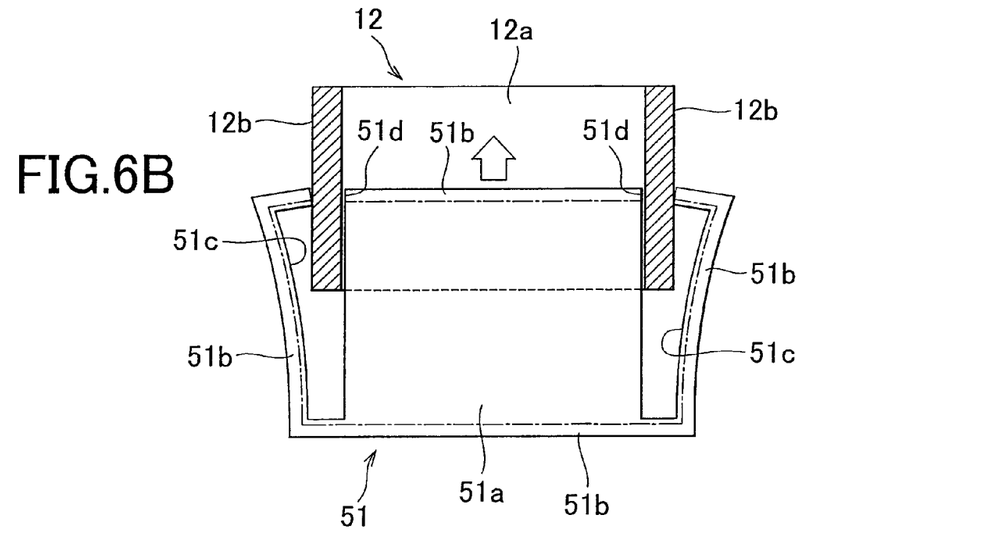

As shown in FIG. 6B, when the sealer 51 brought close to the hinge 12 is brought into contact with the hinge 12, and the sealer 51 is pressed against the hinge 12, the cuts 51d are opened by the leg portions 12b of the hinge 12, and the leg portions 12b get into the through holes 51c. In this case, because the sealer 51 is formed by a flexible resin member, the through holes 51c smoothly open in accordance with the thickness of the leg portions 12b of the hinge 12.

Figure 7:
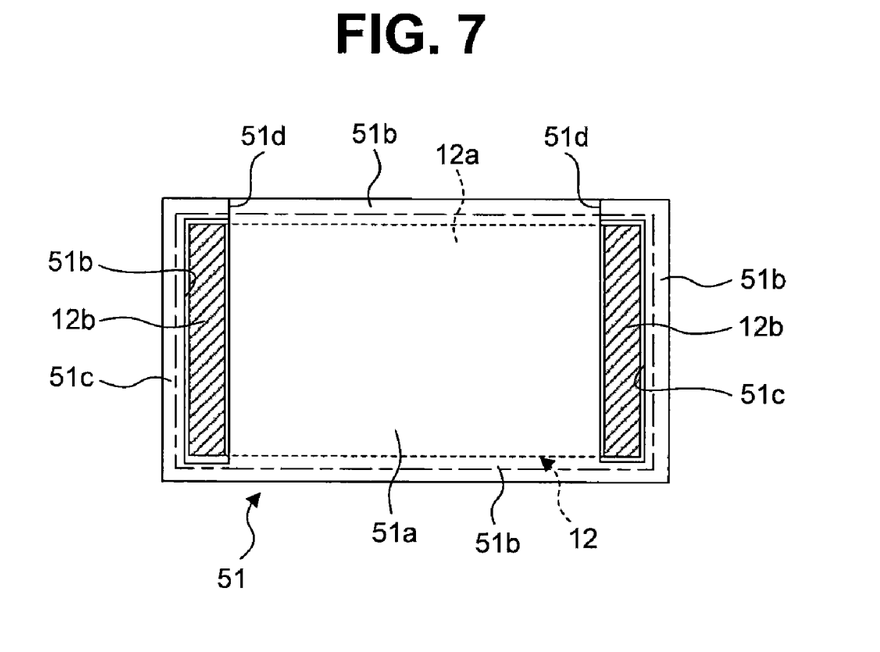
FIG. 7 is a plan view showing the sealer placed on the hinge portion of the back door.
Figure 8:
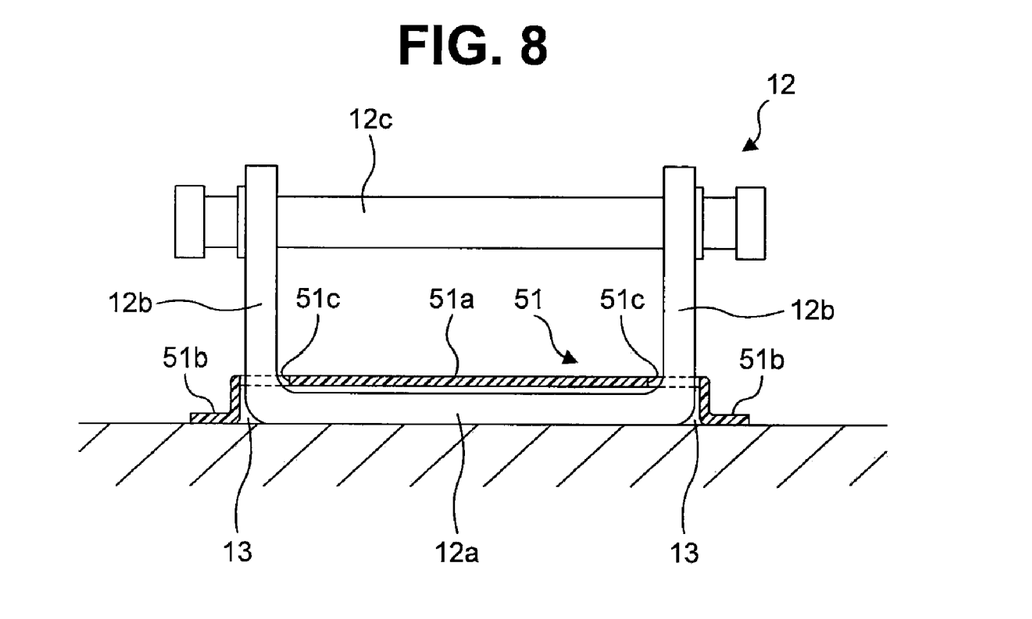
FIG. 8 is a sectional side view showing the sealer placed on the hinge portion of the back door.

Then, as shown in FIGS. 7 and 8, when the leg portions 12b completely get into the through holes 51c, the edges of the through holes 51c are closed due to the elasticity of the resin member by which the sealer 51 is formed, and the sealer 51 is brought into a state in which the sealer 51 is placed on the hinge fixation surface 11 so that the body portion 51a covers the bottom portion 12a of the hinge 12.

Figure 9:
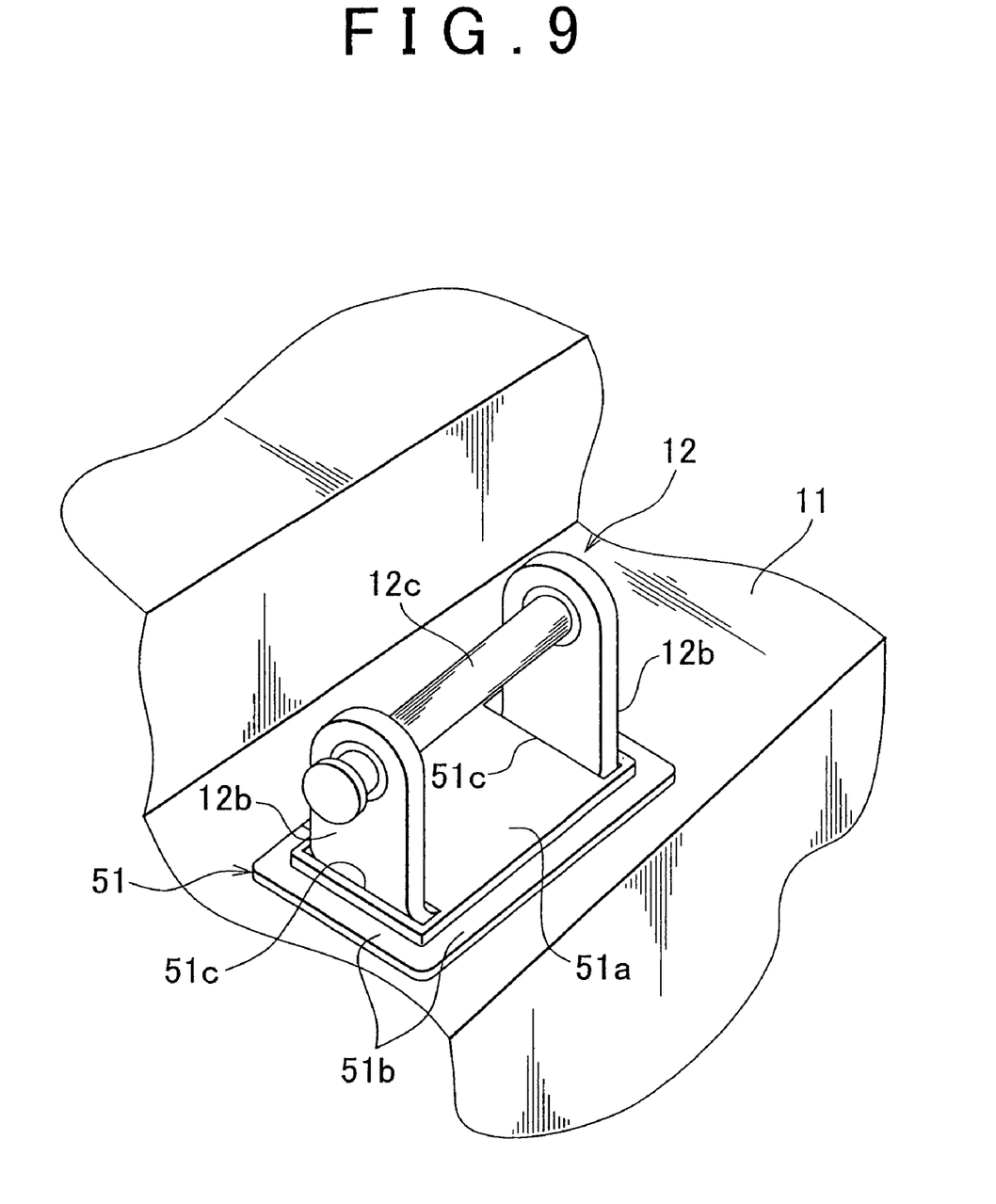
FIG. 9 is a perspective view showing the hinge portion sealed by the sealer.

Thus, when the sealer 51 placed on the hinge fixation surface 11 is heated, the sealer 51 is softened, or melted and liquefied, so that the body portion 51a sticks to the top surface and the side surfaces of the bottom portion 12a of the hinge 12, and to base portions of the leg portions 12b, and in addition, the flange portion 51b sticks to the hinge fixation surface 11. The sealer 51 is then cooled and solidified, whereby the state is stabilized in which the sealer 51 sticks to the hinge fixation surface 11 and the hinge 12 without interruption. In this way, the sealed portion 13 is sealed as shown in FIG. 9.

A sealing step, performed in this way, in which the sealed portion 13 is sealed by the sealer 51 is performed during a coating process in which a vehicle body is coated. The sealing step is performed after an undercoating step (electrodeposition coating step). The sealing step includes a step of placing the sealer 51 on the hinge portion on the hinge fixation surface 11, and a drying step in which the sealer 51 is put into a heating furnace and then heated and softened or melted. The sealer 51 is cooled and solidified after the drying step, whereby the sealed portion 13 is sealed.

In the drying step, the conventional sealer paste that is applied to joint portions and/or overlapping portions between panels in the hood, doors, etc. is also dried and cured by heating. In addition, a second coat step and a finish coating step are performed after the sealing step.

Because the coating that is applied to a vehicle body can also be applied to the sealer 51 in the second coat step and the finish coating step, it is possible to coat the portion sealed by the sealer 51 by the same color as that of the vehicle body, and it is therefore possible to secure the high-quality appearance of the vehicle.

Assume that the sealer 51 for sealing the sealed portion 13 is used to seal the hinge portion on the hinge fixation surface 11 that is located, in the vehicle body, at a high position around which the working space is small because, for example, there are stepped portions nearby. Even in this case, because the operation performed by the operator is merely to place the sealer 51 on a portion of the hinge 12 that is fixed to the hinge fixation surface 11, it is possible to easily perform the operation in a comfortable posture, standing on the floor on which the sealing step is performed, and there is no need to perform the operation in an unnatural posture, standing on a step placed on the floor, even when the hinge fixation surface 11 is located at a high position. In addition, because there is no need either to set an applicator to the sealed portion to apply a sealer thereto or to perform finishing with the use of a brush, it is possible to easily perform the operation even when the sealed portion is located at a position around which the working space is small (even when there is no space enough to set the applicator or the brush to the sealed portion). Thus, it is possible to finish the operation performed in the sealing step in a short period of time, the fatigue caused by the operation is small, and it is possible to secure the quality of sealing.

The sealer 51 is made of thermoplastic resin that is solid at room temperature, and softened or melted by heating. Thus, the sealer 51 is solid and can be easily handled when the sealer 51 is placed on the hinge portion on the hinge fixation surface 11. Meanwhile, the sealer 51 is softened or melted by heating in a drying step. Thus, the sealer 51 sticks to the sealed portion 13, and it is possible to reliably perform sealing.

Furthermore, the sealer 51 can be appropriately formed in a shape that matches the three-dimensional shape of the sealed portion 13 to be sealed. Thus, even when the sealed portion 13 has a complex shape, it is possible to reliably perform sealing by using the sealer 51 having a shape that matches the complex shape. Moreover, the surface of the sealer 51 can be coated similarly to the metal plate forming a vehicle body, and it is therefore possible to secure the high-quality appearance of a vehicle body after coating.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A sealer for sealing a portion to be sealed, the sealer comprising a sheet member formed into a shape and being configured to seal the portion to be sealed by placing the sealer over the portion to be sealed and heating the sealer, wherein the sheet member has a three-dimensional shape and includes a body portion having a box shape whose bottom is open prior to placing the sealer over the portion to be sealed, wherein the body portion defines at least one through hole; the sealer further comprising a flange portion extending from a lower end peripheral portion of the body portion; and a cut formed in the body portion at an inner edge defining the least one through hole, wherein the cut extends from the inner edge to an outer edge of the flange portion, and wherein the cut is configured to open to allow an object to be inserted into the through hole.

2. The sealer according to claim 1, wherein the sealer is made of thermoplastic resin that is solid at room temperature, and softened or melted by heating.

3. The sealer according to claim 1, wherein the three-dimensional shape has a height that is at least a few millimeters.

4. The sealer according to claim 1, wherein the body portion is configured to cover a top surface and side surfaces of the portion to be sealed and a flange portion is extended horizontally outwardly from the lower end peripheral portion of the body portion.

5. The sealer according to claim 1, wherein the sealer is configured to seal an entire periphery of a portion in which a first member and a second member that is smaller than the first member are put together.

6. The sealer according to claim 1, wherein the at least one through hole defined in the body comprises two through holes defined at opposite sides of the body portion.

7. The sealer according to claim 1, wherein the body portion includes an upper wall opposite the open bottom, and four side walls extending from the upper wall to form the box shape, wherein the upper wall and the four side walls define a cavity configured to receive the portion to be sealed.

8. The sealer according to claim 7, wherein the flange portion extends from each of the four side walls substantially parallel to the upper wall of the body portion.

9. A method of sealing a sealed portion, comprising: placing, over the sealed portion, a sealer that is a sheet member having a shape that matches a three-dimensional shape of the sealed portion and heating the sealer placed en over the sealed portion, wherein the sheet member includes a body portion having a box shape whose bottom is open prior to placing the sealer over the sealed portion, wherein the body portion defines at least one through hole; the sealer further comprises a flange portion extending from a lower end peripheral portion of the body portion; and a cut formed in the body portion at an inner edge defining the least one through hole, wherein the cut extends from the inner edge to an outer edge of the flange portion, and wherein the cut opens to allow an object to be inserted into the through hole.

10. The sealing method according to claim 9, wherein the sealer is made of thermoplastic resin that is solid at room temperature, and softened or melted by heating.

11. The sealing method according to claim 9, including placing the body portion over the sealed portion so as to cover a top surface and side surfaces of the sealed portion, wherein the flange portion is extended horizontally outwardly from the lower end peripheral portion of the body portion.

12. The sealing method according to claim 9, wherein the sealed portion is an entire periphery of a portion in which a first member and a second member that is smaller than the first member are put together.

13. The sealing method according to claim 9, wherein the at least one through hole defined in the body comprises two through holes defined at opposite sides of the body portion.

14. The sealing method according to claim 9, wherein the sealed portion comprises a portion of a hinge.

* * * * *